No. 715,107. Patented Dec. 2, 1902.
W. MELVIN.
SINK CLEANING DEVICE.
(Application filed Mar. 10, 1902.)
(No Model.)
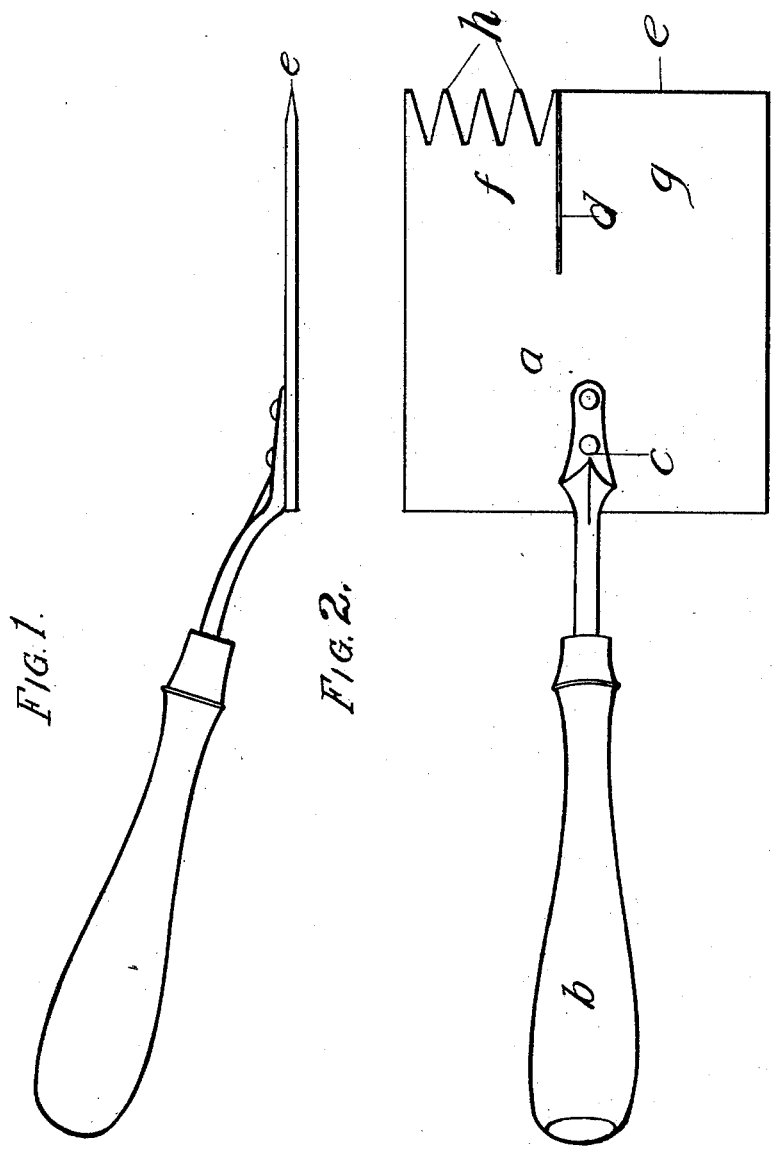
WITNESSES
INVENTOR
William Melvin
BY
Edgar Tate
ATTORNEYS
THE NORRIS PETERS CO., PHOTO-LITHO., WASHINGTON, D. C.

UNITED STATES PATENT OFFICE.

WILLIAM MELVIN, OF NEW YORK, N. Y.

SINK-CLEANING DEVICE.

SPECIFICATION forming part of Letters Patent No. 715,107, dated December 2, 1902.

Application filed March 10, 1902. Serial No. 97,555. (No model.)

*To all whom it may concern:*

Be it known that I, WILLIAM MELVIN, a citizen of the United States, residing at New York, in the county of New York and State of New York, have invented certain new and useful Improvements in Sink-Cleaning Devices, of which the following is a full and complete specification, such as will enable those skilled in the art to which it appertains to make and use the same.

The object of this invention is to provide an improved device for cleaning sinks and other receptacles of various kinds and classes, a further object being to provide a device of this class which is made approximately in the form of a shovel and which is of a form and construction particularly adapted for the object specified, but which may be used for other purposes.

The invention is fully disclosed in the following specification, of which the accompanying drawings form a part, in which the separate parts of my invention are designated by suitable reference characters in each of the views, and in which—

Figure 1 is a side view of my improved sink-cleaning device, and Fig. 2 a plan view thereof.

In the practice of my invention I provide a device of the class specified which comprises a shovel portion $a$ and a handle portion $b$. The shovel portion $a$ is preferably composed of a piece of sheet metal, preferably steel, and of such thickness as to give the required strength thereto.

The handle $b$ is connected with the shovel $a$ at $c$ in the usual order in any preferred manner, and the end of the shovel opposite the handle is split longitudinally for a portion of its length, as shown at $d$, and said end of the shovel is provided with an edge $e$.

The splitting of the shovel at $d$ divides the cutting-edge portion thereof into two separate parts $f$ and $g$, and one of these parts is preferably narrower than the other, and the object of splitting the shovel at $d$ is to give the narrower part thereof a slight spring action, and the cutting edge of said part is formed into projecting teeth $h$, any desired number of which may be employed. The object of the teeth $h$ is to provide means for scraping off, scratching off, or breaking up any substance that adheres to the bottom of the sink and also for cleaning out cavities or depressions forming therein, and these teeth may also be employed for scraping or cleaning serrated, corrugated, or other roughened surfaces. It will also be apparent that the device may be used as an ordinary shovel for cleaning out corners or narrow spaces of any kind or class.

Having fully disclosed my invention, what I claim as new, and desire to secure by Letters Patent, is—

A device of the class described comprising a shovel having a handle secured to one end thereof, said shovel being split for a portion of its length at the cutting edge, and one of the parts of the cutting edge thus formed being provided with teeth, substantially as shown and described.

In testimony that I claim the foregoing as my invention I have signed my name, in presence of the subscribing witnesses, this 7th day of March, 1902.

WILLIAM MELVIN.

Witnesses:
 F. A. STEWART,
 F. F. TELLER.